3,259,463
METHOD FOR ESTIMATING QUICKLY THE NEUTRALIZATION NUMBER OF AUTOMATIC TRANSMISSION FLUID
Charles F. Feasley, Woodbury, N.J., and Fernando A. Pellicciotti, Inglewood, Calif., assignors to Socony Mobil Oil Company, Inc., a corporation of New York
No Drawing. Filed Nov. 30, 1962, Ser. No. 241,168
2 Claims. (Cl. 23—230)

This invention relates to a rapid and improved test for determining the condition of oil with respect to acidic contaminants. In one particular aspect, it relates to a liquid acid-base color indicator test for evaluating the acidity of an automatic transmission fluid in terms of a preselected neutralization number that can be used in the field by personnel without technical training or in the laboratory.

There are in the art several spot color tests used in the petroleum industry to determine oil quality from the standpoint of presence of products of degradation. These tests, while having had some success in special situations, present the problem of discoloration of the absorbent, such as filter paper, and the consequent masking of the indicating solution color so that the tests provide uncertain results. This problem is particularly acute in automatic transmission fluids which are specially compounded lubricants which contain additives to improve their effectiveness. Many of these fluids are colored dark by the additives or subsequent deterioration due to aging and therefore make color testing extremely difficult.

This invention contemplates using an alkaline liquid medium containing a small amount of a color change indicator to determine an acid condition, by a sharp color indication change of the medium, when a measured amount of an automatic transmission fluid is solubilized in it.

The alkaline liquid test solution of this invention is formed by first mixing an alcohol with an inorganic or organic hydroxide to produce a one-tenth normal solution. Then a major proportion of an organic diluent containing a color indicator is mixed with the alcoholic hydroxide solution. Measured portions are taken from this diluent solution to provide the test solution that is used according to the test method of this invention. A few drops of transmission fluid are placed in the solution and thoroughly mixed. The solution will change color if the acidity of the fluid exceeds a predetermined value, otherwise the color of the solution remains substantially the same. Because of the make-up of the solution, its color change is particularly distinct, i.e., green to yellow, when the fluid has a neutralization number of approximately 5.0. This preselected value indicates that the acidity of the fluid has reached a dangerous level and that the fluid should be changed. By comparing the color produced to that shown on a prepared colored chart, an unskilled operator can determine whether the transmission fluid is usable and thereby decide whether or not the fluid should be replaced.

"Neutralization number" is a term widely used in the petroleum industry. It relates to the quantity of acid, expressed in terms of equivalent number of milligrams of potassium hydroxide, required to neutralize all basic constituents present in one gram of oil or to the number of milligrams of potassium hydroxide required to neutralize the acids in a gram of oil. The neutralization number of the oil is expressed in units of milligrams of potassium hydroxide per gram of oil regardless of whether the oil has basic or acidic characteristics. The particular neutralization number selected as a criterion for determining whether an oil should be used or discarded is established by experimentation based on the intended use of the oil.

In accordance with the present invention, the test solution can be prepared so that it will exhibit a sharp change in color, for example, green to yellow, as the neutralization number of the oil placed in the solution in measured amount exceeds 5.0, thus indicating that the oil should be changed.

In addition, the test solution can be so formulated that the sharp change in color will occur where the neutralization number is from about 2 to about 7. Thus, the process of this invention can be adjusted to give a "go-no-go" determination of the acidity of an oil according to the desired degree of acidity that is permissible in the oil for good operation or use.

To discern easily whether the fluid should be replaced, as indicated by the sharp color change, it is important that the strength of the hydroxide within the test solution be sufficient to neutralize the acidity of the fluid essentially at the preselected neutralization number. Furthermore, because the test solution will oftentimes be prepared before its actual use, the hydroxide must remain soluble in the test solution for extended periods of time. Advantageously, it has been found that tetrabutyl ammonium hydroxide is a strong base which has adequate solubility in the test solution and possesses good shelf life in accordance with the requirements of the present invention.

It will be appreciated that other hydroxides, including potassium hydroxide, may be used to provide the necessary alkaline condition within the test solution, the criterion being whether these compounds maintain the alkaline condition over suitable periods of time.

It will be understood that several functions of the test solution are performed by the diluent which forms the major proportion of the solution. Not only are the color indicator, the hydroxide, and the fluid to be tested solubilized by the diluent, but also the dark, troublesome color of the fluid is substantially reduced, thereby allowing the color of the indicator to be clearly discernible. Furthermore, the diluent provides a sufficient ionizing medium to insure the neutralization reaction between the acid contaminants of the automatic transmission fluid and the hydroxide of the test solution. In order to achieve these results, the diluent is made from a combination of a substituted aromatic hyrocarbon, an alcohol and a minor portion of distilled water. Toluene is the preferred aromatic component; however, other aromatic monocyclic hydrocarbons containing alkyl substituents such as xylene may be used. The alcohol component must be essentially anhydrous and although isopropyl alcohol is preferred, any anhydrous lower aliphatic alcohol having 1 to about 4 carbon atoms may be utilized.

Exemplary of the organic acid-base indicators which exhibit the desired color distribution and provide the sharp color change for the preselected neutralization number established for automatic transmission fluids are the following:

| Indicator | Approximate pH Range | Commercial Designation |
|---|---|---|
| Meta-Cresol Purple | 7.6–9.2 | Eastman Kodak 2118. |
| p-Naphtholbenzein | 8.2–10.1 | Eastman Kodak 924. |
| Cresol Red | 7.2–8.8 | Eastman Kodak 744. |
| p-Xylenol Blue | 8.0–9.6 | Hartman-Leddon 1040. |
| Thymol Blue | 8.0–9.8 | Eastman Kodak 753. |

Advantageously, other indicators may be used to produce the color range required by the present invention and the above list should be taken as merely illustrative of the type of indicators that may be employed.

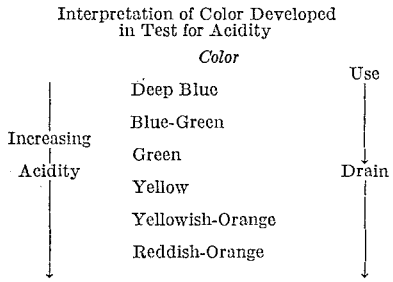

Interpretation of Color Developed in Test for Acidity

```
                      Color
                                          Use
              |   Deep Blue             |
              |                         |
              |   Blue-Green            |
  Increasing  |                         |
    Acidity   |   Green                 |
              |                         ↓
              |   Yellow               Drain
              |                         |
              |   Yellowish-Orange      |
              |                         |
              |   Reddish-Orange        |
              ↓                         ↓
```

In accordance with the invention, the above diagram shows the manner in which test solution employing p-naphtholbenzein and the other preferred constituents provides a sharp color change (green to yellow) indicating the acidity of the tested automatic transmission fluid and whether or not it should be discarded. If the fluid is not too acidic and is usable, the color of the test indicator extends from blue to green, but when the fluid is too acidic or drainable, the color indicator ranges from yellow to reddish orange. The contrast between the green basic color and the yellow acid color produces a clear line of demarcation for the person performing the test. In actual practice, a color chart would be prepared which would be used as a guide in determining the desired neutralization number cut point or the degree of acidity of the oil. Furthermore, a scale of neutralization numbers corresponding to the various colors can be provided so that an operator can estimate the degree of acid degradation that has taken place in the oil from use.

It will be appreciated that the use of a liquid system of this invention produces a simple, reproducible and accurate method of determining whether the acidity of an automatic transmission fluid is above or below a predetermined critical value and thus gives a "go-no go" method of deciding whether an automatic transmission fluid should be retained or discarded. Additionally, because the fluid to be checked is substantially diluted in the test, the color masking problem which plagued the spot tests of the prior art is completely eliminated by the present invention.

It will be further appreciated that because of its simplicity and portable characteristics, this test provides a rapid and inexpensive method which can be embodied easily into a test kit for field use.

These and other objects and advantages of the test will be apparent from the following description of the invention.

The test will be described using the preferred method as a test for automatic transmission fluids. The method may be modified for use in determining the neutralization number of other lubricating oils such as motor oils, transformer oils, etc.

In the preparation of the test solution according to this invention, a one-tenth normal alcoholic solution of tetrabutyl ammonium hydroxide is prepared and standardized. Then an indicator solution ranging from .01 to .03 molarity is prepared to contain equal volume proportions of toluene and anhydrous alcohol together with a smaller proportion of distilled water, said proportion of water being approximately one-hundredth the volume of the toluene proportion. Next, the indicator solution is diluted with a solvent solution consisting of toluene and isopropyl alcohol in equal volume proportions and a minor proportion of distilled water to form a combined solvent-indicator solution.

Then from about 0.5 ml. to about 10 ml. of the alcoholic tetrabutyl ammonium hydroxide solution are mixed with sufficient solvent-indicator solution to form 500 ml. of test solution; the specific amount of hydroxide being determined by the equivalent number of milligrams of potassium hydroxide per milliliter necessary to obtain a given neutralization number.

In the next step, quantities of from about 0.05 to about 0.50 ml. of transmission fluid may be added to about 5 to about 50 ml. of the test solution. These measurements can be made in any suitable manner, such as with pipette measuring dropper or other suitable apparatus capable of fairly accurate measure of the fluid. The number of milliliters of test solution is usually governed not only by the sample size, but also by the amount of diluent and alkali constituents within the solution.

After the fluid is added to the test solution, it is thoroughly mixed and allowed to stand for a few minutes. The test color is then interpreted using a chart similar to that shown in the above diagram.

REAGENT PREPARATION

The following reagents were prepared for testing of automatic transmission fluid:

*No. 1.*—A 10-gram charge of Eastman Kodak Reagent 7774 (a 25 wt. percent solution of tetrabutyl ammonium hydroxide in methanol) is added to a 100 ml. volumetric flask and diluted with freshly boiled anhydrous isopropyl alcohol to the 100 ml. mark. After careful mixing, the solution is stored in a chemically resistant bottle protected from the atmosphere by a guard tube, which may be Ascarite (sodium hydroxide deposited on asbestos). The solution is standardized to 0.08 to 0.1 normal tetrabutyl ammonium hydroxide solution.

*No. 2.*—An indicator solution is prepared by dissolving 10 grams of p-naphtholbenzein in 500 ml. of toluene, 495 ml. of anhydrous isopropyl alcohol, and 5 ml. of distilled water.

*No. 3.*—A solvent-indicator solution is made up in a one-liter flask by mixing 500 ml. of toluene, 495 ml. of anhydrous isopropyl alcohol, 5 ml. of distilled water and 5 ml. of the indicator solution (No. 2).

*No. 4.*—The test solution is prepared by mixing the solvent-indicator solution (No. 3) with the standardized tetrabutyl ammonium hydroxide solution. This may be conveniently done by adding the equivalent of 30.00 milligrams of potassium hydroxide as 5.35 ml. of 0.1 N alcoholic tetrabutyl ammonium hydroxide solution to a 500 ml. flask and then diluting to the 500 ml. mark with the solvent-indicator solution (No. 3).

Special precautions must be taken to protect this reagent from carbon dioxide of the air. Five-milliliter portions are carefully measured by a burette fitted with a U-shaped drying tube containing Ascarite and Drierite for elimination of moisture and carbon dioxide. Each 5-ml. portion is run directly into a 2-dram transparent vial and tightly sealed immediately. It is not reopened until the automatic transmission fluid sample is to be dropped in for test purposes.

Storage of the reagent under refrigeration, for example at 32° F., is found to improve the reagent stability.

The following sampling technique is carried out to select the automatic transmission fluid:

SAMPLING TECHNIQUES

The engine of an automobile is allowed to run until the engine is warm. The dip stick is removed from the automatic transmission and the oil allowed to drain from the dip stick into a special receiver. If desired, a sample may be removed by use of a tygon tube. This step is repeated until approximately 3 to 4 ml. of the sample are obtained.

TESTING

The test is then carried out as follows:

(1) Obtain one vial of the test reagent containing 5 ml. of the test solution. The reagent is dark blue and must be kept sealed from air contamination until used.

(2) Charge a dropper having a 2-millimeter outside diameter with the oil sample. Wipe excess oil from the outside of the tip.

(3) Open the vial and slowly drop in 4 drops (approx. 0.07 ml.) of oil with the dropper held in the vertical position. The oil must be expelled slowly enough that the drops form and fall freely from the dropper tip into the test vial. By using the dropper with a 2-millimeter outside diameter and following this procedure, the measurement of the amount of fluid added is sufficiently accurate for the test.

(4) After the fluid is added, the vial is capped and the contents mixed by vigorous shaking. In approximately one minute or less, the color development is complete.

(5) The test results are then interpreted using a colored chart similar to that depicted in the diagram.

If the color developed is blue to green, the neutralization number is below 5.0 and the fluid may be retained in the automatic transmission. If the color is yellow to orange, the neutralization number of the fluid has risen above 5.0 and it should be discarded.

In order to demonstrate the ease of operation and time required to practice the invention, the following test procedure is conducted by a lubricating technician in a service station. A recent model Cadillac automobile was allowed to idle for five minutes until the engine was warm and a 4 ml. sample of automatic transmission fluid was obtained by removing the dip stick four times and allowing the fluid to drain into a 5 ml. container. Then the technician filled a dropper having a tip of 2-mm. O.D. tubing and 25 mm. long with the fluid. A 5 ml. sealed vial of the test reagent was selected and the color of the indicator was noted as being deep blue. The cap of the vial was removed and four drops of the automatic transmission fluid were added drop-by-drop to the vial. The technician then quickly screwed the cap back onto the vial and shook the contents. In about one minute or less the color of the oil reagent mixtured turned a blue-green, indicating that the fluid was still in good condition and did not need to be replaced. This entire procedure only took about one minute to perform, not including the time for allowing the automobile engine to warm up.

The invention is further illustrated by the following specific but nonlimiting examples:

EXAMPLE I

A series of runs were completed in which the condition of the fluid using the test procedures outlined above was compared with the actual neutralization number (NN) determined using the standard analytical techniques. The data from a run using a Cadillac transmission on a test stand are tabulated below:

TABLE I

| On Test Stand, Time in Hours | Actual N.N. | Test Results, Color | Fluid Condition |
| --- | --- | --- | --- |
| 0 (new oil) | 2.65 | Blue-green | O.K. |
| 150 | 4.27 | Green | O.K. |
| 200 | 5.68 | Yellowish-orange | Discard. |
| 250 | 10.70 | Reddish-orange | Do. |

These runs were repeated several times using Cadillac, Powerglide, and Mercomatic automatic transmissions. The results are summarized in the table below.

TABLE II

| Example No. | Time in Hours | Actual N.N. | Test Results, Color | Fluid Condition |
| --- | --- | --- | --- | --- |
| II | 50 | | Blue | O.K. |
| | 100 | 0.35 | do | O.K. |
| | 150 | | do | O.K. |
| | 200 | 0.80 | do | O.K. |
| | 300 | 1.7 | do | O.K. |
| III | 0 | 1.4 | do | O.K. |
| | 144 | 1.4 | do | O.K. |
| | 230 | 13 | Reddish-orange | Discard. |
| | 250 | 21 | do | Do. |
| IV | 0 | 4.2 | Green | O.K. |
| | 50 | 4.2 | do | O.K. |
| V | 0 | 3.5 | Blue-green | O.K. |
| | 50 | 3.9 | do | O.K. |
| | 100 | 3.9 | Green | O.K. |
| | 150 | 4.9 | Yellow | Discard. |
| | 200 | 7.3 | Reddish-orange | Do. |
| | 250 | 8.9 | do | Do. |
| | 300 | 12.0 | Orangish-red | Do. |
| VI | 0 | | Green | O.K. |
| | 100 | | do | O.K. |
| | 150 | | Yellowish-orange | Discard. |
| | 200 | | Reddish-orange | Do. |
| VII | 0 | | Blue | O.K. |
| | 50 | | do | O.K. |
| | 150 | | do | O.K. |
| | 250 | 0.25 | do | O.K. |
| VIII | 0 | | | |
| | 50 | | Blue | O.K. |
| | 100 | 1.4 | do | O.K. |
| | 200 | 2.2 | Blue-green | O.K. |
| | 250 | 2.8 | do | O.K. |
| | 300 | 3.3 | Green | O.K. |
| IX | 0 | 0.32 | Blue | O.K. |
| | 50 | | do | O.K. |
| | 100 | 0.30 | do | O.K. |
| | 150 | | do | O.K. |
| | 200 | 0.30 | do | O.K. |
| | 250 | | do | O.K. |
| | 300 | 0.30 | do | O.K. |
| X | 0 | 0.93 | do | O.K. |
| | 50 | | do | O.K. |
| | 100 | 0.91 | do | O.K. |
| | 150 | | do | O.K. |
| | 200 | 1.3 | do | O.K. |
| | 250 | | do | O.K. |
| | 300 | 1.8 | Bluish-green | O.K. |

It is obvious from a comparison of the data collected in the test with the data obtained by actual determination of neutralization numbers that the test method is very accurate. The absence of the color masking difficulty of the spot test methods is emphasized in the 150- and 200-hour data in Example I and the 100- and 150-hour data in Example V. In both of these examples the yellow and yellowish-orange color changes as the neutralization number approached a value of 5.0 were clear and easily discernible.

EXAMPLE XI

A series of test solution reagents were prepared for detecting acidic failure points in the neutralization number range of 0 to 6.0 within automatic transmission fluids and known blends of oleic acid in clean mineral oil. Test solution reagent B of the following Table III is the preferred solution for the "go-no go" test of automatic transmission fluids.

Table III

PREPARATION OF TETRABUTYL AMMONIUM HYDROXIDE REAGENTS FOR GIVEN NEUTRALIZATION NUMBER FAILURE LEVELS

| Reagent | Tetrabutyl Ammonium Hydroxide Required for 500 ml. Reagent | | |
| --- | --- | --- | --- |
| | Equivalent Amount of mg. of Potassium Hydroxide | Milliliters of 0.087 N Tetrabutyl Ammonium Hydroxide Titrant | Failure Level Neutralization Number |
| A | 36.8 | 7.58 | 6.13 |
| B | 30.0 | 6.17 | 5.0 |
| C | 27.75 | 5.71 | 4.63 |
| D | 27.00 | 5.56 | 4.5 |
| E | 25.50 | 5.25 | 4.25 |
| F | 24.00 | 4.94 | 4.0 |
| G | 21.00 | 4.32 | 3.5 |
| H | 18.00 | 3.70 | 3.0 |
| I | 15.00 | 3.09 | 2.5 |
| J | 12.00 | 2.47 | 2.0 |
| K | 9.00 | 1.85 | 1.5 |
| L | 6.00 | 1.23 | 1.0 |
| M | 3.00 | 0.62 | 0.5 |

It is clear from the above data that the present test method can be applied to a great number of oil products in which acidic contaminants are found. The test has sufficient flexibility to adjust the neutralization number to a value suitable for the intended use of the products. Furthermore, each of the reagents provides a discernible color change at the preselected neutralization number.

In addition, it is readily apparent that the present invention is a substantial improvement over the prior spot test methods. Not only does the test produce a full scope of colors having a sharp color change for the desired neutralization number preselected for each oil, but also the test provides a rapid and reliable means for deciding whether an automatic transmission fluid should be retained or discarded.

It will be understood that the color diagram and the data shown herein are merely illustrative of the sharp color change that is obtained by the preferred embodiment of the invention, and that other similar sharp color changes can be produced by changing the specific test solution used or by selecting a different neutralization number as criterion for rejecting the fluid being tested.

It will be further understood that the invention described herein is limited only to the scope of the appended claims and that various changes and modifications may be effected without departing from the spirit of the invention.

What is claimed is:

1. A color test solution for detecting the presence of detrimental amounts of acids in used automatic transmission fluids of combustion-type engines which comprises from about five milliliters to about 50 milliliters of a solution capable of providing a sharp color change when from about 0.05 milliliter to about 0.50 milliliter of a used automatic transmission fluid having a neutralization number of from 2 to about 7 is solubilized therein, said test solution containing sufficient quantity of a hydroxide to be equivalent to the number of milligrams of potassium hydroxide per milliliter of solution necessary to obtain the said neutralization number, an acid-base indicator having a pH range of from about 7 to about 10, and the remainder of said solution consisting of a solvent admixture containing toluene and isopropyl alcohol and about one part by volume of water per 100 parts by volume of toluene, said acid-base indicator having a molarity of approximately from about $3 \times 10^{-5}$ to about $15 \times 10^{-5}$ in said solution whereby a transmission fluid containing acid above a safe neutralization number can be colorimetrically detected in said solution.

2. A method of protecting automatic transmissions by detecting the presence of detrimental amounts of acids in used automatic transmission fluid which comprises forming a color test solution from a hydroxide, an alcohol, an aromatic hydrocarbon, water, and an organic acid-base indicator which in said solution will change its color from blue to reddish-orange as the acidity of the solution increases and will provide a sharp color change from green to yellow when a used automatic transmission fluid has a neutralization number of from about 2 to about 7, said solution containing sufficient quantity of said hydroxide to be equivalent to the number of milligrams of potassium hydroxide per milliliter of solution necessary to obtain the neutralization number, and introducing the said fluid into said solution in such proportions that a sharp color change will indicate that the fluid is detrimental to the life of the transmission and should be changed.

References Cited by the Examiner

UNITED STATES PATENTS

| | | | |
|---|---|---|---|
| 1,674,416 | 6/1928 | Taylor | 23—253 |
| 1,975,245 | 10/1934 | Zackheim | 23—253 X |
| 2,770,530 | 11/1956 | Bergstrom | 23—230 |
| 3,030,190 | 4/1962 | Seemann et al. | 23—230 |
| 3,193,356 | 7/1965 | Smith et al. | 23—230 |

OTHER REFERENCES

Fisher Catalog 59, "Modern Laboratory Appliances," U.S.A., 1958, pp. 577–579.

MORRIS O. WOLK, *Primary Examiner.*

JAMES H. TAYMAN, Jr., *Examiner.*